United States Patent Office 3,201,425
Patented Aug. 17, 1965

3,201,425
20-ALKOXY-Δ²⁰-21-CARBOXALDEHYDES OF THE PREGNANE SERIES AND METHOD OF PREPARING THE SAME
John Paul Dusza, Nanuet, N.Y., Joseph Peter Joseph, Cliffside Park, N.J., and Seymour Bernstein, New City, N.Y., assignors to American Cyanamid Company, Stamford, Conn., a corporation of Maine
No Drawing. Filed Dec. 10, 1963, Ser. No. 329,385
17 Claims. (Cl. 260—397.1)

This invention relates to new steroid compounds. More particularly it relates to 20-lower alkoxy-Δ²⁰-21-carboxaldehydes of the pregnane series and methods of preparing the same.

The novel steroids of the present invention may be illustrated by the following formula:

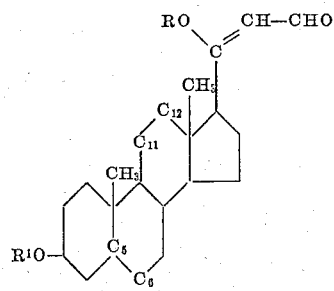

where R is lower alkyl, R¹ is selected from the group consisting of hydrogen and lower alkanoyl, $C_5$–$C_6$ is a trivalent radical selected from the group consisting of

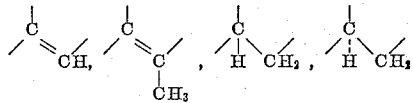

and

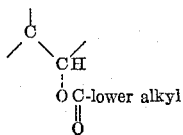

and $C_{11}$—$C_{12}$ is a divalent radical selected from the group consisting of

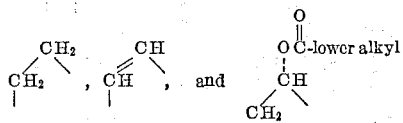

The novel process of this invention consists of reacting an appropriate steroid having at the 17-position an acetyl group with a trialkylorthoformate in the presence of an acid such as perchloric acid or fluoroboric acid. Ordinarily the reaction is carried out by adding in excess of one equivalent of aqueous perchloric acid (e.g., 72% perchloric acid) or fluoroboric acid, usually at a rate of rapid dropping, to a vigorously stirred suspension of steroid in an excess of trialkylorthoformate. Generally, the reaction is substantially complete after 5–15 minutes of stirring after the addition of the designated acid, and the product may be recovered, after neutralization with an acid acceptor such as pyridine, by pouring the neutralized reaction mixture into water and collecting the product by filtration. Purification of the product may usually be achieved by direct crystallization although in some cases intermediate purification techniques such as chromatography may be necessary. It is generally convenient to carry out the reaction at approximately room temperature, but higher temperatures may occur as a result of the exothermic characteristic of the reaction process.

There is evidence that the course of the novel reaction of this invention includes formation of an intermediate perchlorate or fluoroborate salt. For the purpose of this invention, however, no emphasis need be given to this since the intermediates are unstable, and are not isolated when the reaction is run for preparative purposes.

A very wide variety of starting steroids may be used in carrying out the process of this invention, it being necessary only that there be a 20-keto function. Functional groups elsewhere in the steroid molecule which are sensitive to trialkylorthoformates will of course react appropriately during the intended reaction unless such groups are blocked.

Among the starting steroids which have been found useful for the novel reaction of this invention are the following: 3β-acetoxypregn-5-en-20-one; 3β-hydroxypregn-5-en-20-one; 3β-acetoxy-16α-methylpregn-5-en-20-one; 3β-acetoxyallopregnan-20-one; 3β-hydroxyallopregnan-20-one; 3β-acetoxypregnan-20-one; 3β-acetoxy-6-methylpregn-5-en-20-one; 3α,6α-diacetoxypregnan-20-one; 3α,12α-diacetoxypregnan-20-one; 3,3-dimethoxypregn-11-en-20-one and the like.

The reaction by which 20-lower alkoxy-Δ²⁰-21-carboxaldehyde steroids may be converted into their corresponding etianic esters consists of a permanganate oxidation. The steroid is dissolved in a suitable solvent such as acetone, and an excess of permanganate salt (e.g., potassium permanganate) is added. The mixture is stirred for 2 hours, more or less, and water is added. The reaction mixture is cooled, and sulfur dioxide is bubbled through the mixture until excess permanganate is reduced. The acetone is removed by evaporation under reduced pressure, and the resulting suspension is poured into water. The product is collected by filtration and crystallized from an appropriate solvent system. The utility of etianic esters is described by Fieser and Fieser in their book entitled, "Steroids," page 610 (chart 5) Compound I, which is shown as convertible into deoxycorticosterone acetate. The 20-lower alkoxy-Δ²⁰-21-carboxaldehydes of the pregnane series in themselves have utility as hypocholesteremic agents, and therefore are useful in the treatment of vascular disorders.

Example 1.—Preparation of 3β-acetoxy-21-formyl-20-methoxypregna-5,20-dione

A suspension of 10 grams of 3β-acetoxy-5-pregnen-20-one in 100 milliliters of trimethylorthoformate is stirred vigorously, and 4.7 milliliters (2.1 equivalents) of 72% perchloric acid is added at a rapid rate of dropping. After addition is complete, the reaction mixture is stirred for 10 minutes, after which 5 milliliters of pyridine is added, and the entire mixture is poured into water. The product is collected by filtration and recrystallized from acetone-petroleum ether, melting point 187°–189° C.

In a further experiment carried out as above, concentrated fluoroboric acid is substituted for perchloric acid to give the product of the example.

Example 2.—Preparation of 3β-acetoxy-20-ethoxy-21-formylpregna-5,20-diene

Following the procedure of Example 1, and substituting triethylorthoformate for trimethylorthoformate the product 3β-acetoxy-20-ethoxy-21-formyl-pregna-5,20-diene is obtained, melting point 175–178° C.

Example 3.—Preparation of 21-formyl-3β,20-dimethoxypregna-5,20-diene

Using the procedure described in Example 1 and substituting 3β-hydroxypregn-5-en-20-one for 3β-acetoxy-5- pregne-20-one the product 21-formyl-3β,20-dimethoxypregna-5,20-diene is obtained, melting point 144°–145° C.

*Example 4.—Preparation of 3β-acetoxy-21-formyl-20-methoxy-16α-methylpregna-5,20-diene*

When the procedure of Example 1 is followed and 3β-acetoxy-16α-methylpregn-5-en-20-one is used in place of 3β-acetoxy-5-pregnen-20-one, the product 3β-acetoxy-21-formyl - 20 - methoxy-16α-methylpregna-5,20-diene is obtained, melting point 204°–206° C.

*Example 5.—Preparation of 3β-acetoxy-21-formyl-20-ethoxy-16α-methylpregna-5,20-diene*

Following the procedure of Example 1 and substituting 3β-acetoxy-16α-methylpregn-5-en-20-one for 3β-acetoxy-5-pregnen-20-one and triethylorthoformate for trimethylorthoformate there is obtained 3β-acetoxy-21-formyl-20-ethoxy-16α-methylpregna-5,20-diene, melting point 203°–205° C.

*Example 6.—Preparation of 3β-acetoxy-21-formyl-20-methoxyallopregn-20-ene*

Using the procedure described in Example 1 and substituting 3β-acetoxyallopregnan-20-one for 3β-acetoxy-5-pregnen - 20- one the product 3β-acetoxy-21-formyl-20-methoxyallopregn-20-ene is obtained, melting point 191°–192° C.

*Example 7.—Preparation of 3β-acetoxy-21-formyl-20-ethoxyallopregn-20-ene*

When 3β-acetoxyallopregnan-20-one and triethylorthoformate are reacted as in Example 1, the product is 3β-acetoxy - 20 - ethoxy-21-formylallopregn-20-one, melting point 126°–127° C.

*Example 8.—Preparation of (1) 21-formyl-20-methoxyallopregna-2,20-diene, (2) 21-formyl-3β-formyloxy-20-methoxyallopregn-20-ene and (3) 21-formyl-20-methoxyallopregn-20-en-3β-ol*

Following the procedure of Example 1 and substituting 3β-hydroxyallopregnan-20-one for 3β-acetoxy-5-pregnen-20-one gives after chromatographic separation 21-formyl-20-methoxyallopregna-2,30-diene, melting point 186°–187° C.; 21 - formyl-3β-formyloxy-20-methoxyallopregn-20-ene, melting point 136°–137° C.; and 21-formyl-20-methoxyallopregn-20-en-3β-ol, melting point 227°–229° C.

*Example 9.—Preparation of 3β-acetoxy-21-formyl-20-methoxypregn-20-ene*

When the procedure of Example 1 is followed and 3β-acetoxypregnan-20-one is substituted for 3β-acetoxy-5-pregnen-20-one, the product obtained is 3β-acetoxy-21-formyl - 20 - methoxypregn-20-ene, melting point 137°–138° C.

*Example 10.—Preparation of 3β-acetoxy-21-formyl-20-methoxy-6-methylpregna-5,20-diene*

Using the procedure described in Example 1 and substituting 3β-acetoxy-6-methylpregn-5-en-20-one for 3β-acetoxy - 5 - pregnen-20-one, the product 3β-acetoxy-21-formyl-20-methoxy - 6 - methylpregna-5,20-diene is obtained, melting point 155°–156° C.

*Example 11.—Preparation of 3α,6α-diacetoxy-21-formyl-20-methoxypregn-20-ene*

Substituting 3α,6α-diacetoxy-20-one for 3β-acetoxy-5-pregnen-20-one in the process of Example 1, produces 3α,6α-diacetoxy-21-formyl-20-methoxypregn-20-ene.

*Example 12.—Preparation of 3α,12α-diacetoxy-21-formyl-20-methoxypregn-20-ene*

Using the procedure of Example 1 and substituting 3α,12α-diacetoxypregn-20-one for 3β-acetoxy-5-pregnen-20-one, the product 3α,12α-diacetoxy-21-formyl-20-methoxypregn-20-ene is obtained.

*Example 13.—Preparation of 21-formyl-3,3,20-trimethoxypregna-11,20-diene*

Following the procedure of Example 1 and substituting 3,3-dimethoxypregn-11-en-20-one for 3β-acetoxy-5-pregnen - 20 - one, the product 21-formyl-3,3,20-trimethoxypregna-11,20-diene is obtained.

*Example 14.—Preparation of 21-formyl-20-methoxypregna-5,20-dien-3β-ol*

When 3β - acetoxy-21-formyl-20-methoxypregna-5,20-diene is hydrolyzed with sodium methoxide in methanol, the product 21-formyl - 20 - methoxypregna-5,20-dien-3β-ol, melting point 208°–209° C. is obtained.

*Example 15.—Preparation of 20-ethoxy-21-formylpregna-5,20-dien-3β-ol*

Hydrolyzing 3β - acetoxy-20-ethoxy-21-formylpregna-5,20-diene with sodium methoxide in methanol gives 20-ethoxy - 21 - formylpregna-5,20-dien-3β-ol, melting point 191°–192° C.

*Example 16.—Preparation of 3β-acetoxy-17β-carbamethoxyandrost-5-ene*

A solution of 3β-acetoxy-21-formyl-20-methoxypregna-5,20-diene (0.5 g.) in acetone (50 ml.) is treated with potassium permanganate (2.0 g.). The reaction mixture is stirred for 2 hours and then water (25 ml.) is added. The reaction mixture is cooled in an ice bath and a stream of sulfur dioxide bubbled through the mixture until the precipitated manganese dioxide is dissolved. The acetone is removed under reduced pressure and the resultant suspension poured into water. The material is filtered and recrystallized from methanol water to yield the desired ester, melting point 155°–156° C.

*Example 17.—Preparation of 3β-acetoxy-17β-carboethoxyandrost-5-ene*

Following the procedure of Example 16 and using 3β-acetoxy-20-ethoxy-21-formylpregna-5,20-diene in place of 3β-acetoxy-21-formyl-20 - methoxypregna-5,20-diene the product 3β-acetoxy-17β-carboethoxyandrost-5-ene, melting point 130°–132° C. is obtained.

*Example 18.—Preparation of 3β-acetoxy-17β-carbomethoxyandrostane*

Using the process of Example 16 and substituting 3β-acetoxy-21-formyl-20 - methoxypregn-20-ene in place of 3β-acetoxy-21-formyl-20 - methoxypregna-5,20-diene, the product 3β-acetoxy-17β-carbomethoxyandrostane, melting point 139°–140° C.

*Example 19.—Preparation of 17β-carbomethoxyandrostan-3-one*

When the process of Example 16 is followed and 21-formyl-3β-hydroxy-20-methoxyallopregnene is substituted for 3β-acetoxy-21-formyl - 20-methoxypregna-5,20-diene, the product 17β-carbomethoxyandrostan-3-one, melting point 171°–172° C. is obtained.

We claim:
1. A steroid of the formula:

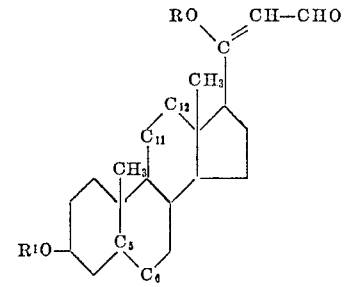

wherein R is lower alkyl, $R^1$ is selected from the group consisting of hydrogen and lower alkanoyl, $C_5-C_6$ is a trivalent radical selected from the group consisting of

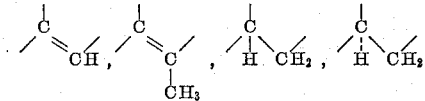

and

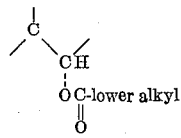

and $C_{11}-C_{12}$ is a divalent radical selected from the group consisting of

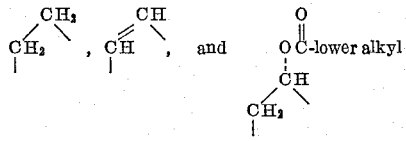

2. The compound 3β-acetoxy-20 - ethoxy-21-formyl-pregna-5,20-diene.

3. The compound 21-formyl-3β,20-dimethoxypregna-5,20-diene.

4. The compound 3β-acetoxy-21-formyl-20-methoxy-16α-methylpregna-5,20-diene.

5. The compound 3β-acetoxy-20-ethoxy-21-formyl-16α-methylpregna-5,20-diene.

6. The compound 3β-acetoxy-21 - formyl-20-methoxy-allopregn-20-ene.

7. The compound 3β-acetoxy-21 - formyl-20-methoxy-pregn-20-ene.

8. The compound 3β-acetoxy-21 - formyl-20-methoxy-6-methylpregna-5,20-diene.

9. The compound 3α,6α - diacetoxy-21 - formyl-20-methoxypregn-20-ene.

10. The compound 3α,12α-diacetoxy-21 - formyl-20-methoxypregn-20-ene.

11. The compound 21-formyl-3,3,20-trimethoxypregna-11,20-diene.

12. The compound 21-formyl-20-methoxypregna-5,20-dien-3β-ol.

13. The compound 20-ethoxy-21 - formylpregna-5,20-dien-3β-ol.

14. A method of preparing a steroid of the formula:

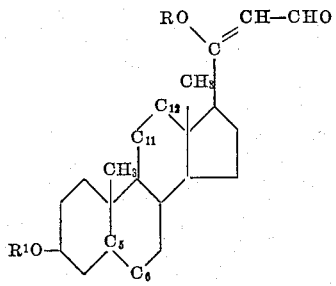

wherein R is lower alkyl, $R^1$ is selected from the group consisting of hydrogen and lower alkanoyl, $C_5-C_6$ is a trivalent radical selected from the group consisting of

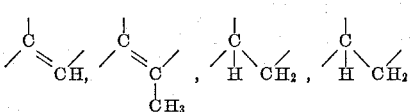

and

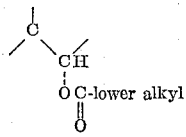

and $C_{11}-C_{12}$ is a divalent radical selected from the group consisting of

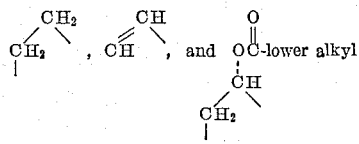

which comprises contacting the corresponding 17-acetyl steroid with a tri(lower)alkylorthoformate in the presence of an acid selected from the group consisting of perchloric acid and fluoroboric acid and recovering said product therefrom.

15. A method of preparing 3β-acetoxy-20-methoxy-21-formylpregna-5,20-diene which comprises contacting 3β-acetoxy-5-pregnen-20-one with trimethylorthoformate in the presence of perchloric acid and recovering said compound therefrom.

16. A method of preparing 3β-acetoxy-17β-carbomethoxyandrost-5-en which comprises contacting 3β-acetoxy-5-pregnen-20-one with trimethylorothoformate in the presence of perchloric acid and subsequently treating the reaction product with potassium permanganate and recovering said compound therefrom.

17. A method of preparing 3β-acetoxy-17β-carbomethoxyandrostane which comprises contacting 3β - acetoxy-pregnan-20-with trimethylorthoformate in the presence of perchloric acid and subsequently treating the reaction product with potassium permanganate and recovering said compound therefrom.

References Cited by the Examiner

UNITED STATES PATENTS 3,021,345  2/62  Waddington-Feather et al.
260—397.5

LEWIS GOTTS, *Primary Examiner.*